United States Patent [19]

Magoulick

[11] 4,426,881

[45] Jan. 24, 1984

[54] LIQUID CRYSTAL PRESSURE GAUGE

[75] Inventor: David M. Magoulick, Uniontown, Ohio

[73] Assignee: National Distillers and Chemical Corporation, New York, N.Y.

[21] Appl. No.: 397,952

[22] Filed: Jul. 14, 1982

[51] Int. Cl.³ .............................................. G01L 7/08
[52] U.S. Cl. ...................................... 73/146.8; 73/715
[58] Field of Search ...................... 73/146.8, 715, 800; 137/557; 116/212, 266; 350/330, 354, 351

[56] References Cited

U.S. PATENT DOCUMENTS

| | | | |
|---|---|---|---|
| 3,114,836 | 12/1963 | Fergason et al. | 350/351 |
| 3,322,485 | 5/1967 | Williams | 350/331 R |
| 3,364,433 | 1/1968 | Freund et al. | 330/4.6 |
| 3,768,886 | 10/1973 | Sharpless | 350/330 |

Primary Examiner—Donald O. Woodiel
Attorney, Agent, or Firm—Kenneth D. Tremain

[57] ABSTRACT

A pressure gauge utilizing pressure sensitive liquid crystals. Several embodiments are disclosed of a liquid crystal tire pressure gauge associated with a valve stem of a tire. A pressure chamber in the gauge is provided with access to the tire pressure, and includes a transparent window for allowing viewing therethrough. A liquid crystalline material is mounted within the window, and is subjected to the pressure being measured such that it is responsive to different pressures to provide different visual appearances, thereby providing a reading of the pressure. In different embodiments, the pressure chamber is constructed as an integral part of the valve stem, or alternatively the pressure chamber is constructed as an integral part of an attachment cap which mounts on the valve stem. In the latter embodiment, the valve stem attachment includes a pressure release which is subject to manual actuation to release pressure from the tire into the pressure chamber to obtain a pressure reading from the liquid crystal material.

9 Claims, 6 Drawing Figures

LIQUID CRYSTAL PRESSURE GAUGE

BACKGROUND OF THE INVENTION

1. Field of the Invention

The present invention relates generally to a pressure gauge incorporating therein liquid crystals to provide a visual indication of the pressure being measured, and more particularly pertains to a tire pressure gauge associated with a tire valve stem to provide a visual indication of the tire pressure.

2. Discussion of the Prior Art

The prior art discloses a number of different types of pressure indicators which are associated with tire valve stems to indicate the internal pressure of a tire. These pressure indicators can be constructed as an integral part of the valve stem, or can be designed as part of an attachment cap which normally threadedly engages the valve stem. Poster, U.S. Pat. No. 1,807,752, Becciani et al., U.S. Pat. No. 3,224,264 and Trinca, U.S. Pat. No. 3,177,724 are typical of the aforementioned prior art approaches to such pressure indicators. However, these prior art pressure indicators have all suffered from a major disadvantage in that they are basically mechanically operated pressure gauges, typically being dependent upon a calibrated spring or molded diaphragm to sense and react to the internal pressure of the tire.

The prior art also discloses a number of different applications for liquid crystalline materials. For example, Fergason et al., U.S. Pat. No. 3,114,836 depicts an imaging device which exhibits a color pattern on a film of liquid crystal upon focusing a heat or thermal pattern thereon. Fergason U.S. Pat. No. 3,409,404 discloses a liquid crystalline device in which variations in selective scattering of liquid crystalline materials is employed for identifying unknown materials. Williams, U.S. Pat. No. 3,322,485 utilizes a threshold characteristic of liquid crystalline material to scatter light selectively in the presence of a given electric field. Freund et al., U.S. Pat. No. 3,364,433 employs a frequency-shifting characteristic of liquid crystalline materials in the presence of an electric and/or magnetic field. None of these references, however, discloses a pressure indicator utilizing liquid crystalline materials in which the liquid crystal materials are utilized in a simple and direct fashion to obtain a visual indication of a pressure being sensed.

Sharpless U.S. Pat. No. 3,768,886 is of interest to the present invention by disclosing a variable color display which utilizes liquid crystalline materials therein and also by disclosing much material and data on stress responsive cholesteric liquid crystalline materials. In this patent selected liquid crystalline materials preferably exhibit a variable scattering or transmitive characteristic when subjected to mechanical deformation, such as occasioned by shear or flow stresses. The display device includes a liquid crystal cell which is provided with a light transmitting wall to permit viewing of the contained liquid crystalline material, and the liquid crystalline cell is associated with means for inducing mechanical stresses within the contained liquid crystalline material. This is accomplished in a variety of ways in different embodiments. For example, in one embodiment the liquid crystalline cell is constructed to permit the displacement of one wall structure thereof relative to another. In another embodiment, circulating means is associated with the cell or display device for inducing flow and attendant shear stresses within the liquid crystalline material. The display device is capable of a number of applications, for example as an aesthetic novelty, decorative wall and table top panels, back drops for stages and other illuminated areas, and numerous analogous applications.

SUMMARY OF THE INVENTION

Accordingly, it is a primary object of the present invention to provide a pressure gauge utilizing pressure sensitive liquid crystals.

A further object of the subject invention is the provision of a tire pressure gauge which is nonmechanical in nature and does not require a mechanically actuated sensor such as a calibrated spring or a molded diaphragm.

An additional object of the present invention is the provision of a liquid crystal tire pressure sensor which is associated with the valve stem of the tire, but does not interfere with the normal functions of the valve or valve core. The liquid crystals do not require an external power source, and also in preferred embodiments are sealed relative to the surrounding environment such that the crystalline material remains stable, and is not affected by vibrations or moisture.

In accordance with the teachings herein, the present invention provides a pressure gauge including a pressure chamber which is provided with access to the pressure being measured. The pressure chamber includes a substantially transparent window allowing viewing therethrough, and a liquid crystalline material is mounted within the transparent window, and is subjected to the pressure being measured such that it is responsive to different pressures to provide different visual appearances to thereby provide a reading of the pressure. In different embodiments, the pressure gauge is associated with a valve stem to measure tire pressure, and the pressure chamber is constructed as an integral part of the valve stem, or alternatively the pressure chamber is constructed as an integral part of an attachment cap which mounts on the valve stem. In the latter embodiment, the valve stem attachment includes a pressure release which is subject to manual actuation to release pressure from the tire into the pressure chamber to obtain a pressure reading from the liquid crystal material.

In several preferred embodiments herein, the transparent window is constructed as a substantially cylindrical member providing viewing therethrough around its circumference, and the liquid crystal is mounted on the inner cylindrical surface of the window. In greater detail, a flexible, cylindrical pressure-transmitting member is mounted within and on the inner cylindrical surface of the window, with a narrow annular gap being provided therebetween, and the liquid crystal material is sealed in the annular gap.

In one embodiment herein, the liquid crystal material consists of a single type of liquid crystal, and the window also displays a color/pressure code to enable different colors of the liquid crystal to be directly interpreted as different pressures. In a second embodiment, the liquid crystal material comprises several different types of liquid crystals, with each type of liquid crystal being responsive to a different pressure range to become visually prominent, and each type of liquid crystal has a pressure reading associated therewith to indicate the pressure.

BRIEF DESCRIPTION OF THE DRAWINGS

The foregoing objects and advantages of the present invention for a liquid crystal tire pressure gauge may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
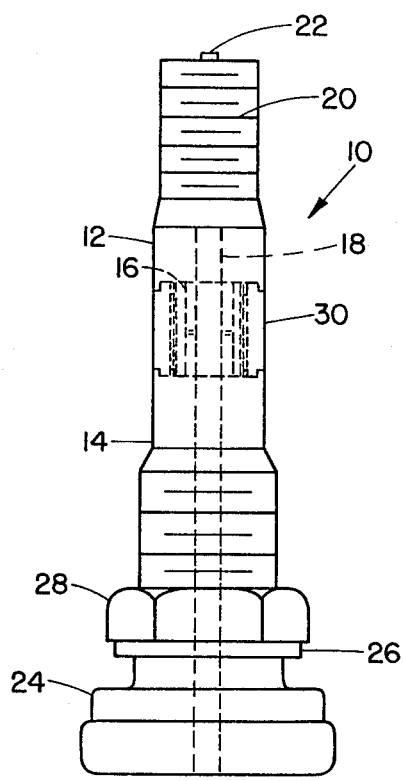
FIG. 1 is an elevational view of a first exemplary embodiment of a tire stem having a pressure responsive liquid crystal display which is constructed pursuant to the teachings of the present invention.
Figure 2:
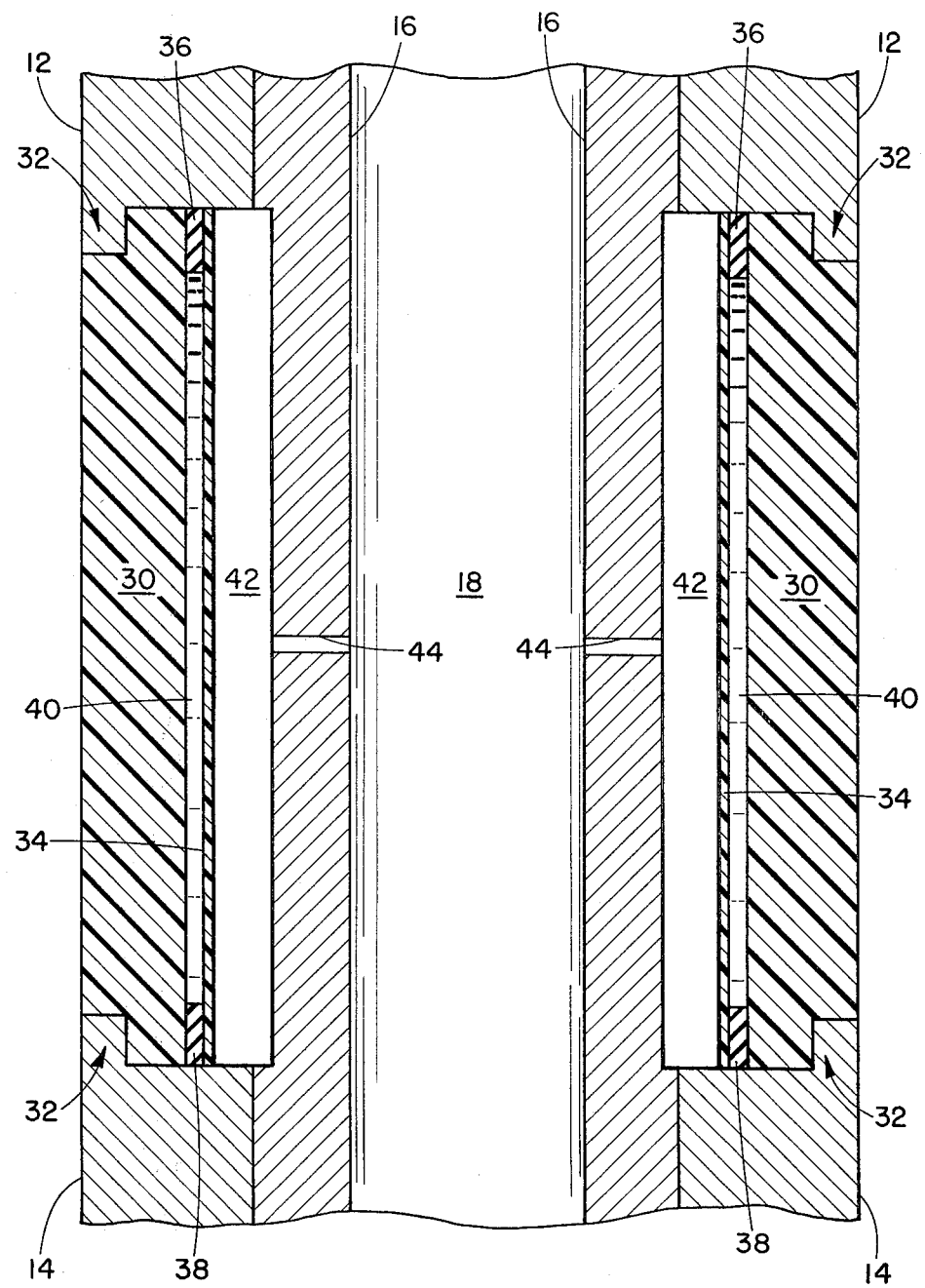
FIG. 2 illustrates an enlarged sectional view of the liquid crystal display portion of the embodiment of FIG. 1.

Referring to the drawings in detail, FIG. 1 is an elevational view and FIG. 2 an enlarged sectional view of a first exemplary embodiment of the present invention in which a tire stem denoted generally by reference numeral 10 includes upper and lower stem housings, respectively 12, 14 coupled to each other by a central stem 16 that defines a main air passageway 18 for inflating the tire. Most of the construction of the valve stem is conventional, and the upper stem housing 12 includes external threads 20 for engagement of a cap and inner threads, for engagement of an internally mounted valve core 22. The lower stem housing 14 includes a rubber grommet 24 for providing a seal relative to a wheel rim, a ring washer 26, and a hex nut 28 for tightening the seal provided by grommet 24.

The pressure responsive liquid crystal display is mounted centrally around the central stem 16, and includes a clear plastic cylindrical window 30 mounted between the upper and lower stem housings 12, 14. The upper and lower axial ends of cylindrical window 30 can be stepped with annular recesses as shown at 32 to provide a more effective seal relative to the housings 12, 14, and an appropriate sealer is utilized to provide a pressure-tight seal therebetween. A flexible cylindrically-shaped pressure-transmitting member or diaphragm 34 is mounted on the inner cylindrical surface of the window 30 and is spaced therefrom by upper and lower annular seals 36, 38 such that a narrow annular gap is formed between the window 30 and the pressure-transmitting diaphragm 34. One or more appropriate types of liquid crystals 40, as discussed in detail below, are sealed in this annular gap.

An annular pressure chamber 42 is defined around the central valve stem 16 between it and the diaphragm 34, and several radially extending apertures 44 are provided through the valve stem 16 such that the pressure within the tire is communicated by central air passage 18 and apertures 44 to the pressure chamber 42, and pressure-transmitting flexible diaphragm 34 communicates this pressure to the liquid crystals 40, which are then stressed against the outer window 30 by the differences in pressure between the tire pressure and atmospheric pressure.

Figure 5:
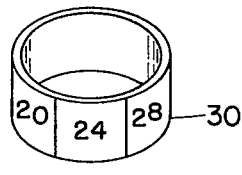
FIGS. 4 and 5 are schematic illustrations of two different types of liquid crystal pressure sensing arrangements pursuant to the present invention.
Figure 4:
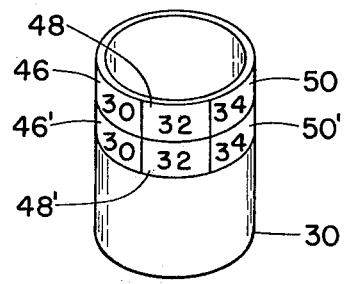

FIGS. 4 and 5 illustrate two different arrangements of liquid crystal pressure-sensing displays pursuant to the teachings of the present invention. In the arrangement of FIG. 4, a single type of liquid crystal material is placed in the annular gap behind the window 30, and this single type of liquid crystal material is selected, as discussed in detail below, to change color in response to different pressure levels in the pressure chamber 42. A color code is printed at the top, or any appropriate location, of the window 30 which correlates different colors of the liquid crystal with different pressures, in accordance with the response to the liquid crystal, such that a person reading the pressure gauge need only correlate the present visible color of the liquid crystal material with the printed colors on the window and pick the closest match to read the tire pressure. For instance, as illustrated in FIG. 4, (and considering the nature of cholesteric liquid crystal materials and their response to stress as discussed below) 30 (indicating pressure in psi) might be printed on a green (wavelength=4920–5770 Angstroms) rectangular background 46, 32 (indicating pressure in psi) might be printed on a blue (wavelength=4550–4920 Angstroms) rectangular background 48, 34 might be printed on a violet (wavelength=3900–4550 Angstroms) rectangular background 50, and etc., around the circumference of the window 30. Of course, the particular colors and pressure indications are chosen to match the pressure characteristic response of the liquid crystal 40 in the gauge.

The liquid crystalline material 40 can be selected from one or more of those materials which exhibit variation in color, light scattering, and attendant transmittance characteristics under deformational stresses. Desirably, such variations are within the visible range at ambient temperature conditions prevailing during utilization of the gauge. There are a considerable number of substances which exhibit the characteristics required of the liquid crystalline material 40. In general, the category of materials known as cholesteric liquid crystals are suitable for use with the present invention and exhibit an optical phenomenon known as selective scattering of white light. This categorization of liquid crystals originates in the frequent use of cholesterol as the starting material in synthesizing these organic substances. The derivatives of cholesterol usually are liquid crystalline in character and demonstrate the characteristic of selective light scattering. Liquid crystalline substances fall additionally into the general chemical classifications of esters, carbonic esters, ethers, schiff bases, and related classes. Nominally, the cholesteric liquid crystals are not limited to the use of cholesterol as a base material. Many steroids exhibit similar optical characteristics when synthesized into the general classifications of organic compounds, as mentioned above. These and other cholesteric liquid crystals are useful for the purposes of the present invention as long as their molecular conformation exhibits the necessary anisotropic and optical characteristics.

A cholesteric liquid crystalline material can be utilized which exhibits a relative optical phenomenon attendant to the selective scattering characteristic of this category of liquid crystal. The latter characteristic is the stress or shear sensitivity of certain cholesteric materials whereby the selective scattering characteristic is varied upon the application of deformational stresses.

Cholesteric materials will selectively and visibly scatter white light at selected temperature ranges when two or more of these substances are admixed in proper proportions. Mixtures of liquid crystals can be selected or varied to obtain visual responses at other temperatures for the purposes mentioned previously. It is observed that a physical deformation or stressing of the liquid crystal shifts the frequency of the observed cholesteric color display or pattern, when viewed at a given angle, toward the blue or shorter wave length end of the visible spectrum. The amount of color shift, measured in wavelengths can be employed to indicate quantitatively the pressure applied to the cholesteric material, when a given liquid crystalline material has been properly calibrated.

The embodiment herein can be calibrated to a degree to take into account temperature. For instance, multiple color matches 46, 48, 50 can be provided for different temperature ranges as shown by 46', 48', 50', if that presents a problem, or the user could be instructed that the gauge is only accurate within a given temperature range, selected of course to suit the area of utilization. Further considerations with respect to temperature are also discussed herein in greater detail in the discussion on suitable liquid crystal materials.

The embodiment of FIG. 5 illustrates a second arrangement of a liquid crystal pressure sensing display similar in concept to liquid crystal thermometer displays now in common usage. In this embodiment several different types of liquid crystals are employed having slightly different responses, in terms of their light scattering and transmittance characteristics, to pressure. Each type of liquid crystal is associated with a different pressure, with pressures of 20, 24 and 28 psi being shown in FIG. 5, such that each crystalline material becomes highly visible in a different pressure range. The same considerations of temperature discussed with respect to the FIG. 4 embodiment are applicable to this embodiment also. In one variations of the FIG. 5 embodiment the different pressures can be molded or stamped on the surface of the cylindrical window 30 while the crystals are arranged in bands which effectively "light up" behind each pressure indication. In a second variation, clusters of liquid crystal materials are placed behind pressure readings inlaid in the window at positions therearound.

Figure 3:
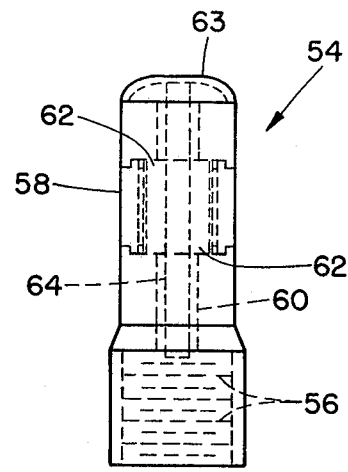
FIG. 3 illustrates an elevational view of a second exemplary embodiment of a liquid crystal tire pressure gauge constructed as an integral part of an attachment cap which mounts on a valve stem.

The embodiment of FIG. 3 is designed to compensate for the properties of some liquid crystalline materials, as discussed below, and also is highly desirable as an add-on or retrofit feature to a standard tire stem. In this embodiment, the pressure chamber and liquid crystal display are constructed as an integral part of an attachment cap 54 which has internal threads 56 to threadedly engage and mount onto a standard valve stem. The liquid crystal display 58 associated with this embodiment can be the same as those discussed with respect to the displays of FIGS. 1, 2, 4 and 5. However, in this embodiment a central, axially located passageway 60 communicates directly with a pressure chamber 62, with the liquid crystal material being positioned therein in the same manner as discussed in detail with respect to FIG. 2. The top 63 of this attachment cap 54 is flexible such that it may be depressed by pushing thereon, and an actuator pin 64 depends centrally downwardly from the top, such that when the cap 54 is threadedly engaged onto a valve stem, the lower end of actuator pin 64 is positioned immediately above the central pressure release pin of a valve core (shown as 22 in FIG. 1) in the valve stem. The entire cap 54 is sealed, such that depression of top 63 causes actuator pin 64 to depress the top of the release pin in the valve and temporarily subject pressure chamber 62 to the internal pressure of the tire. The liquid crystal is then read as to the tire pressure in the same manner as in the previously described embodiments. Release of the top 63 allows the pressure chamber 62 to slowly return to atmospheric pressure as the seal around the threads 56 is not perfectly air-tight and also the volume of chamber 62 is relatively small.

This embodiment compensates for a relaxational effect in some liquid crystal materials as described below. A constant pressure applied to many liquid crystalline materials will not, after its initial application, thereafter appreciably effect the then observed color patterns. Instead, the great variety of color changes or patterns exhibited are produced by changes in applied forces and attendant deformational stresses. With acceleration of changing deformational stresses, in either direction, changes in the observed color patterns become more pronounced.

It has also been observed that the application of a constant deformational stress over a significant period of time will initially induce an observable change in the cholesteric color pattern, which despite continued stress, will revert to the unstressed or original cholesteric color in time. That is to say, there is a relaxational effect in the liquid crystalline structure, owing to its nature.

Stress responsive cholesteric liquid crystalline materials and considerations with respect thereto are discussed in detail in Sharpless U.S. Pat. No. 3,768,886 which is expressly incorporated by reference herein.

Although the embodiment of FIGS. 1 and 2 is illustrated as a clamp-in type valve, a similar embodiment with a snap-in type of valve stem base is also contemplated herein. Moreover, tube valve stems are also within the teachings of the present invention. Different embodiments of the present invention can be constructed for different pressure ranges, with one type provided for passenger car tires, a second for light trucks, and a third for heavy trucks. Moreover, different embodiment of all of the above can be constructed for operation in different temperature ranges, if required.

Figure 6:
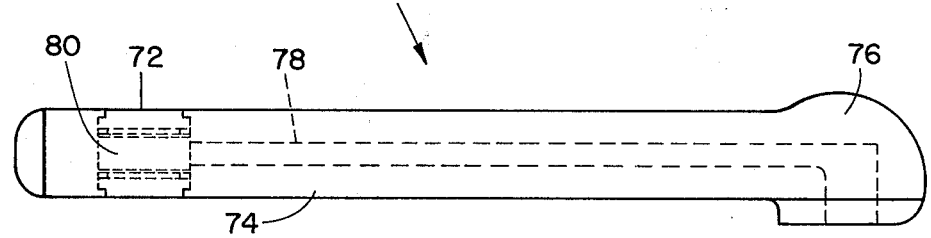
FIG. 6 illustrates a further embodiment of a pencil type of valve gauge constructed pursuant to the teachings herein.

FIG. 6 illustrates an embodiment 70 of the present invention wherein a liquid crystal arrangement and display 72, similar in concept to the embodiment of FIG. 3, is incorporated into a display end of a pencil type tire gauge 74 having a traditional air chuck end 76, which is adapted to be pressed onto the top of a valve stem to obtain a pressure reading for a tire or tube. The valve in the valve stem is momentarily depressed by a central valve actuator in the chuck end 76, as is traditional, to allow the internal tire or tube pressure to be communicated to a central pressure passage 78 leading to a pressure chamber 80, with the pressure sensitive liquid crystal material being positioned and arranged therein the same manner as discussed in detail with respect to FIGS. 2 and 3.

Although a cylindrical shape for the window appears to be a particularly attractive type of design, other types of windows can also be implemented herein. Also, depending upon the types of liquid crystals utilized herein and their mountings, flexible diaphragm 34 and the attendant seals 36 and 38 might be eliminated in some embodiments.

Although the present invention is discussed in detail herein in the context of a tire pressure gauge associated with a valve stem, the teachings herein have applicability to pressure gauges in general.

While several embodiments and variations of the present invention for a liquid crystal tire pressure gauge are described in detail herein, it should be apparent that the disclosure and teachings of the present invention will suggest many alternative designs to those skilled in the art.

What is claimed is:

1. A pressure gauge comprising a pressure chamber which is provided with access to a pressure being measured, said pressure chamber including a substantially transparent window means for viewing therethrough, and at least one liquid crystal mounted within said transparent window means in said pressure chamber to be subjected to the pressure being measured, said liquid crystal being directly responsive to different pressures to provide different visual appearances which thereby provide a visual reading of the measured pressure.

2. A pressure gauge as claimed in claim 1, said pressure gauge being associated with a valve stem to measure tire pressure, and said pressure chamber being constructed as an integral part of the valve stem.

3. A pressure gauge as claimed in claim 1, said pressure gauge being associated with a valve stem to measure tire pressure, and said pressure chamber being constructed as an integral part of an attachment cap which mounts on the valve stem.

4. A tire pressure gauge as claimed in claim 3, said valve stem attachment including a pressure release means which is subject to manual actuation to release pressure from the tire into said pressure chamber to obtain a pressure reading from said liquid crystal.

5. A pressure gauge as claimed in claim 1 or 2 or 3, said window means including a substantially cylindrical window providing viewing therethrough around its circumference.

6. A pressure gauge as claimed in claim 5, said liquid crystal being mounted on the inner cylindrical surface of the cylindrical window.

7. A pressure gauge as claimed in claim 6, further including a flexible cylindrical pressure tranmitting member mounted within the inner cylindrical surface of the cylindrical window, with a narrow annular gap being provided therebetween, and said liquid crystal being sealed in said annular gap.

8. A pressure gauge as claimed in claim 1 or 2 or 3, said liquid crystal consisting of a single type of liquid crystal, and said window means displaying a color/pressure code to enable different colors of the liquid crystal to be directly interpreted as different pressures.

9. A pressure gauge as claimed in claim 1 or 2 or 3, said liquid crystal comprising several different types of liquid crystals, with each type of liquid crystal being responsive to a different pressure range to become visually prominent, and each type of liquid crystal having a pressure reading associated therewith to indicate the measured pressure.

* * * * *